UNITED STATES PATENT OFFICE.

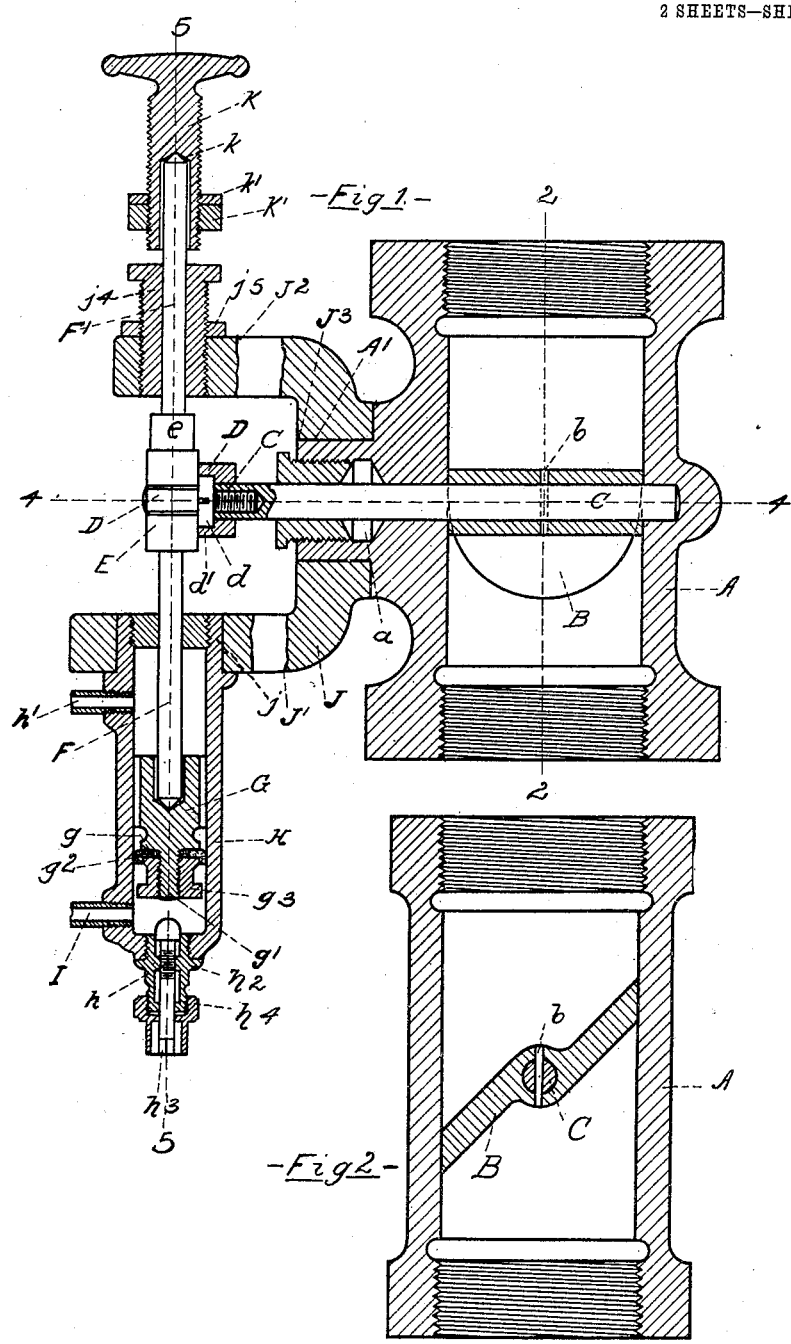

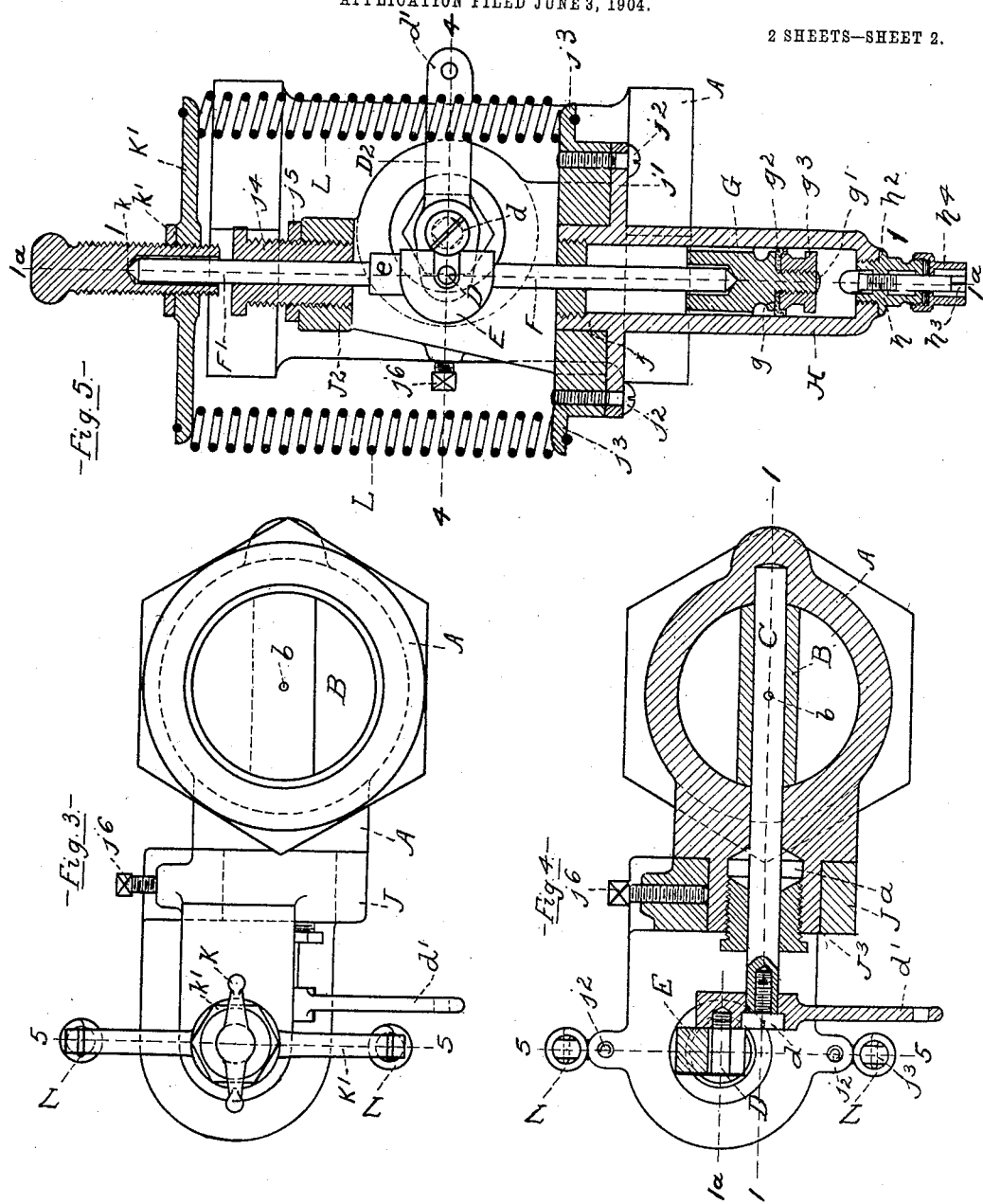

RUDOLPH CONRADER, OF ERIE, PENNSYLVANIA.

PRESSURE-GOVERNOR.

No. 810,108.     Specification of Letters Patent.     Patented Jan. 16, 1906.

Application filed June 3, 1904. Serial No. 211,054.

*To all whom it may concern:*

Be it known that I, RUDOLPH CONRADER, a citizen of the United States, residing at Erie, in the county of Erie and State of Pennsylvania, have invented new and useful Improvements in Pressure-Governors, of which the following is a specification.

This invention relates to pressure-governors; and it consists in certain improvements in the construction thereof, as will be hereinafter fully described, and pointed out in the claims.

The invention is illustrated in the accompanying drawings, as follows:

Figure 1 is a section, the part on the right being on the line 1 1 in Figs. 4 and 5 and the part on the left of the broken line being in section on the lines 1^A in Figs. 4 and 5. Fig. 2 is a section on the line 2 2 in Fig. 1. Fig. 3 is a plan view of the device. Fig. 4 is a section on the line 4 4 in Figs. 1 and 5. Fig. 5 is a section on the line 5 5 in Figs. 1, 3, and 4.

A marks the valve-chamber, in which is arranged a butterfly-valve B, the butterfly-valve B being carried by the rocking stem and arranged to close the passage through the chamber by rocking the valve B. The valve is carried by the stem C, with which it is locked by the pins $b$. The stem C extends out through a gland $a$ and is journaled in the walls of the valve-chamber. A crank D is fitted onto the end of the stem, the stem having, preferably, the square end $c$ for this purpose, as clearly shown in dotted lines in Fig. 5. The crank is secured to the stem by the screw $d$, the head of the screw being seated in the recess $d'$ in the face of the crank. A crank-pin extends from the crank and is engaged by a yoke E. The yoke E is secured to and forms a part of the stem F and extension to the stem F'. The stem F is in line with the crank-pin D', or as nearly so as it can be made with the slight rocking movement of the crank-pin, so that there is practically no side thrust on the stem. The stem F extends into a cylinder H and into contact with the piston G. The piston G is provided with the cup-shoulder $g$ and screw extension $g'$ and is provided with the cup $g^2$, which is secured in place by the nut $g^3$. The cylinder is connected with the pumped fluid through the connection I. An outlet $h'$ takes care of any leakage by the piston. The cylinder H is extended into a socket $j$ in the arm J' of the frame J. It has the shoulders $j'$ and is secured to the arm J' by the screws $j^2$. (See Fig. 5.)

The extension F' extends through the adjusting-stop $j^4$ and extends into a socket $k$ in the adjusting-screw K. The stop $j^4$ is screwed into the arm J² of the frame J. The adjusting-nut K is screwed into a yoke K'. The springs L extend from the ends of this yoke to the hooks $j^3$ on the arm J', said springs being opposed to the pressure in the cylinder H under the piston G.

The operation of the device is as follows: A fluid under pressure passes through the valve-chamber A. The pump fluid is connected with the cylinder H through the connection I. If this pressure increases above the desired maximum, its action on the piston G forces the said piston upwardly against the counter-pressure of the springs L and closes the butterfly-valve B, so as to cut off the source of motor-fluid supply. If the pressure drops below the desired minimum, the force of the springs L overcomes the fluid-pressure under the piston G and, acting through the stem-crank D, opens the valve B, so as to permit a greater quantity of motor-fluid supply. By using the butterfly-valve a range of opening may be obtained with a very slight movement of the piston G, so that there is in the length of the movement a very slight difference in the tension or strength of the springs L. For this reason comparatively short springs L may be used with good results, whereas with the ordinary type of valve for such devices to get such results much longer springs are required or a much more complicated connecting mechanism is made necessary than is possible with this type of valve.

It is desirable to prevent the complete closure of the valve. This I accomplish by the adjustable stop $j^4$, which is screwed in the arm J² and comes into the path of the extension $e$ of the yoke E. A jam-nut $j^5$ is provided for locking this jam-nut $j^4$ in adjustment. It is also desirable to provide means for determining the maximum opening of the valve. This I accomplish by the stop $h$, which is screwed into the end $h^2$ of the cylinder H, the stop having the squared end $h^3$ extending from the gland $h^4$, so as to afford ready means for effecting the adjustment.

The spring-pressure may be adjusted by the adjusting-screw K. Greater tension of course can be obtained where the yoke K', through the action of the screw, is moved to a greater distance from the hooks $j^3$, and, vice versa, the springs are weakened by the action of the adjusting-screw moving the yoke toward said hooks. A locking-nut $k'$ is provided for locking this screw in adjustment.

It is desirable to be able to locate the valve-chamber either in a vertical or horizontal position, as may be made most convenient by the surrounding mechanisms. I accomplish this by rotatively mounting the chamber A on the frame J. The chamber A is provided with the extension A' and the frame with the socket $J^3$, which fits on this extension. The frame may be swung around on this joint to any position desired and locked in this position by the screw $j^6$. An adjustment in this way can be made for each quarter-turn, the crank D being removed from the stem C and turned on the square $c$ to bring it into proper relation with the frame.

What I claim as new is—

1. In a pressure-governor, the combination of a valve-chamber; a butterfly-valve in said chamber; a stem extending from said valve to without the chamber; a pressure device and means for communcating the action of the pressure device to the valve-stem to oscillate the stem, said pressure device and means being arranged to close the valve with an increase of fluid-pressure upon the pressure device, and to open the valve with a decrease in pressure; and an adjustable stop for limiting the opening movement of the valve.

2. In a pressure-governor, the combination of a valve-chamber; a butterfly-valve in said chamber; a stem extending from said valve to without the chamber; a pressure device and means for communicating the action of the pressure device to the valve-stem to oscillate the stem, said pressure device and means being arranged to close the valve with an increase of fluid-pressure upon the pressure device, and to open the valve with a decrease in pressure; and adjustable stops for limiting the closing and opening movements of the valve.

3. In a pressure-governor, the combination of a valve-chamber; a valve in said chamber; a pressure device for controlling said valve, said pressure device comprising the cylinder H, a piston therein; and means connecting the valve; and adjustable stop $h$ screwed into the end of the cylinder and adapted to contact the piston.

4. In a pressure-governor, the combination with the valve-chamber; a valve in said chamber; a pressure device for actuating said valve; a frame for supporting said pressure device, said pressure device comprising a cylinder; a piston therein; a stem connecting said piston with the valve-actuating mechanism; a counter-pressure mechanism operating upon said stem; and the adjusting-screw $j^4$ forming a guide and adjustable stop for the stem for limiting the closing movement of the valve.

5. In a pressure-governor the combination with the valve-chamber; an oscillatory valve therein; a stem extending from said valve to without the chamber; a crank on said stem; and a frame for carrying the pressure device comprising two arms extending each side of the crank; a pressure-cylinder on one of said arms; a yoke engaging said crank; and a stem extending from the pressure-cylinder to the yoke and from the yoke past the second arm on the frame; a spring-yoke on the stem; and springs connecting the spring-yoke to the opposite arm of the frame.

6. In a pressure-governor, the combination of the valve-chamber; an oscillatory valve therein; a stem extending from said valve to without the chamber; a frame J having the arms J' and $J^2$ thereon; a crank D on the stem; the yoke E engaging said crank; the stem F extending through the arm J' and the extension F' extending through the arm $J^2$; a pressure device arranged on the arm J and adapted to operate on the stem F; a spring-pressure device adapted to operate upon the extension F' against the pressure device, said stem F being arranged in line with the crank-pin of the crank; and the adjustable stops $h$ and $j^4$ for limiting the opening and closing movements of the valve.

7. In a governor, the combination with the valve-chamber; a butterfly-valve therein; a stem controlling said butterfly-valve; and valve-actuating means adapted to engage the stem for actuating the valve, said means being rotatively mounted relatively to the valve-chamber.

8. In a governor, the combination with the valve-chamber; a butterfly-valve therein; a stem controlling said butterfly-valve; and valve-actuating means adapted to engage the stem for actuating the valve, said means being rotatively mounted relatively to the valve-chamber and concentric to the valve-stem.

9. In a governor, the combination of the valve-chamber; a butterfly-valve therein; a stem controlling said valve; a valve-actuating means adapted to engage said stem and to actuate the valve, said means being rotatively mounted on the valve-chamber; and means for locking the means in adjustment.

10. In a pressure-governor, the combination ol a valve-chamber; a butterfly-valve in said chamber; a stem for actuating said valve; a pressure device for actuating said valve through said stem; a frame carrying said pressure device, said frame being rotatively mounted relatively to said valve-chamber.

11. In a pressure-governor, the combination of the valve-chamber; a butterfly-valve therein; a stem extending from said valve to without the chamber; a crank on said stem;

means for actuating said crank to actuate the valve; a frame supporting said means, said frame being rotatively mounted relative to said chamber; and means for adjusting the crank on the stem with a change in relation between the frame and the valve-chamber.

In testimony whereof I have hereunto set my hand in the presence of two subscribing witnesses.

RUDOLPH CONRADER.

Witnesses:
C. D. HIGBY,
M. C. SULLIVAN.